United States Patent
Haselwander

(10) Patent No.: US 9,633,692 B1
(45) Date of Patent: Apr. 25, 2017

(54) CONTINUOUS LOOP AUDIO-VISUAL DISPLAY AND METHODS

(71) Applicant: Gregory J. Haselwander, Eau Claire, WI (US)

(72) Inventor: Gregory J. Haselwander, Eau Claire, WI (US)

( * ) Notice: Subject to any disclaimer, the term of this patent is extended or adjusted under 35 U.S.C. 154(b) by 0 days.

(21) Appl. No.: 14/720,507

(22) Filed: May 22, 2015

Related U.S. Application Data

(60) Provisional application No. 62/001,831, filed on May 22, 2014.

(51) Int. Cl.
*H04N 5/77* (2006.01)
*G11B 27/00* (2006.01)
*H04N 9/87* (2006.01)

(52) U.S. Cl.
CPC ............. *G11B 27/007* (2013.01); *H04N 5/77* (2013.01); *H04N 9/87* (2013.01)

(58) Field of Classification Search
None
See application file for complete search history.

(56) References Cited

U.S. PATENT DOCUMENTS

| | | | | |
|---|---|---|---|---|
| 2007/0014541 | A1* | 1/2007 | Im | H04N 5/44513 386/230 |
| 2010/0316359 | A1* | 12/2010 | Mally | G11B 27/007 386/343 |
| 2013/0233841 | A1* | 9/2013 | Gallo | H05B 1/00 219/201 |
| 2013/0336628 | A1* | 12/2013 | Lamb | H04N 9/79 386/224 |

OTHER PUBLICATIONS

Hammi & Vivien; Mr. Toast—Strolling Along; Youtube Video; Mar. 28, 2008; Screenshot 1:20; https://www.youtube.com/watch?v=W8pTG9MIm0l; Germany.

* cited by examiner

*Primary Examiner* — Eileen Adams
(74) *Attorney, Agent, or Firm* — Anthony J. Bourget

(57) ABSTRACT

An audiovisual work displaying a real world setting or object repeats as a video loop such that a viewer having normal visual and cognitive ability is unlikely or unable to detect the loop. The work is devoid of or has minimal instances of outliers which are otherwise more readily detected by a viewer upon successive looping of the segment. The segment may be of different lengths and optionally includes a corresponding audio component. The work is displayed on any type of screen for viewing, and may be delivered via the cloud, as a subscription, or other means. The display allows for a unique sensation where the viewer is locked in time (such as when viewing a still image) yet experiences video motion and audio variety without the sense of being caught in a continuous loop.

28 Claims, 6 Drawing Sheets

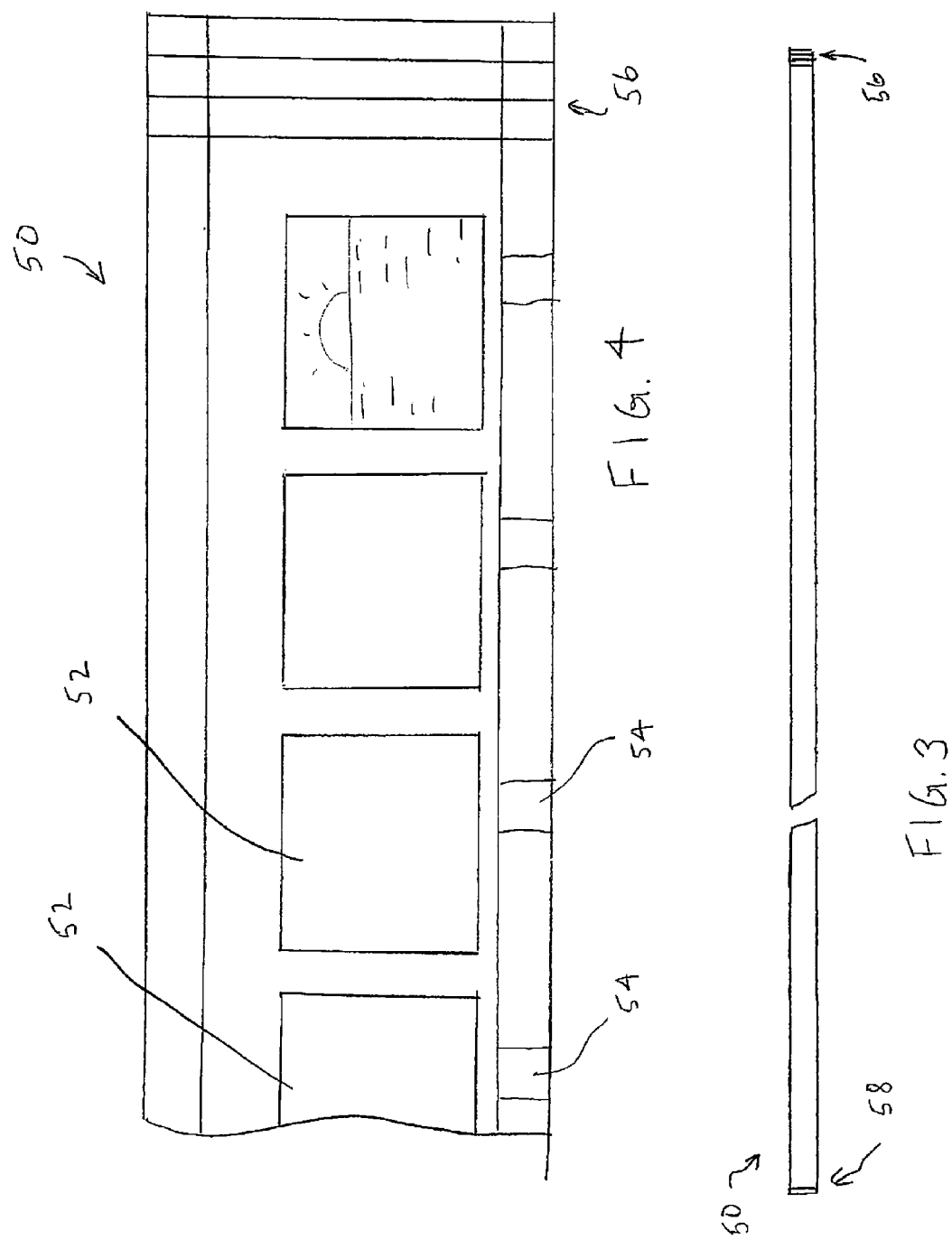

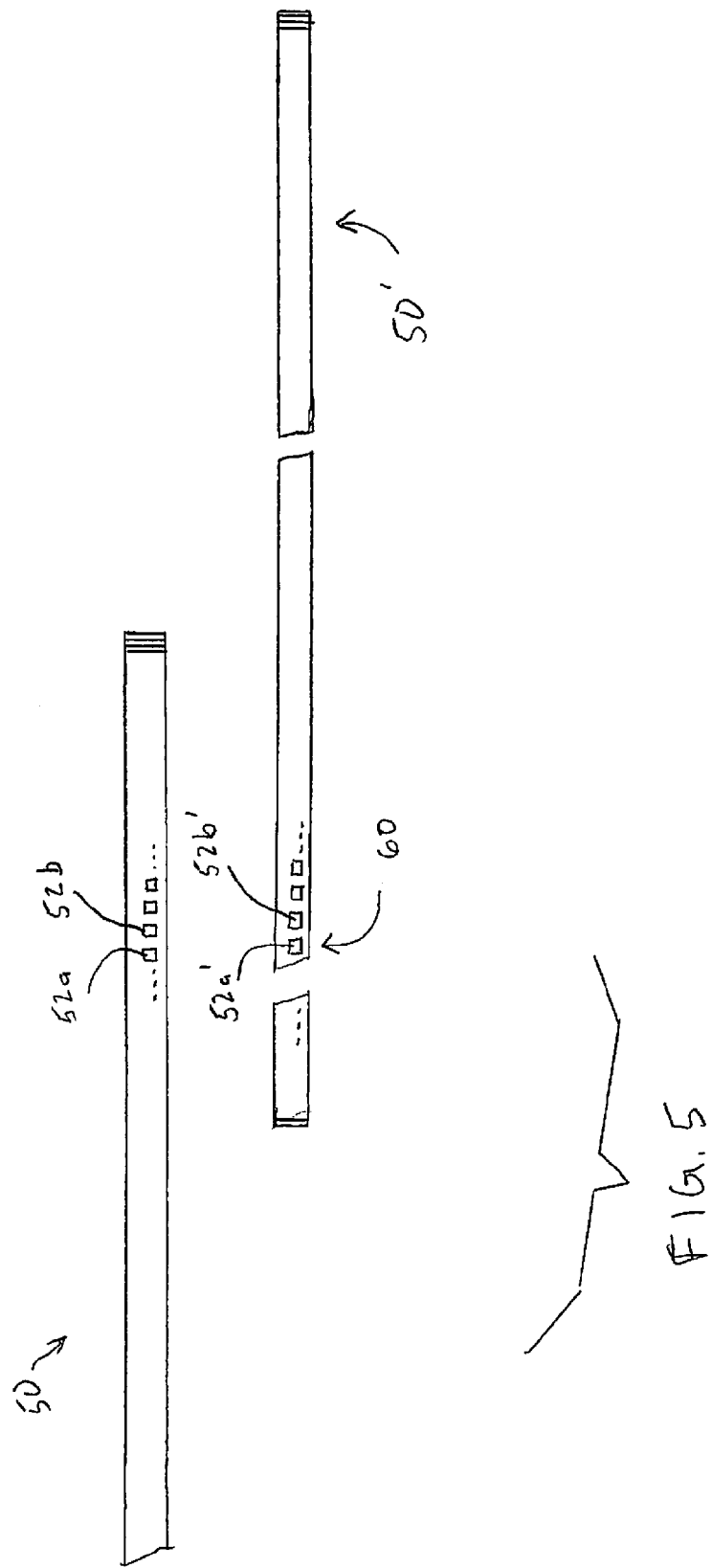

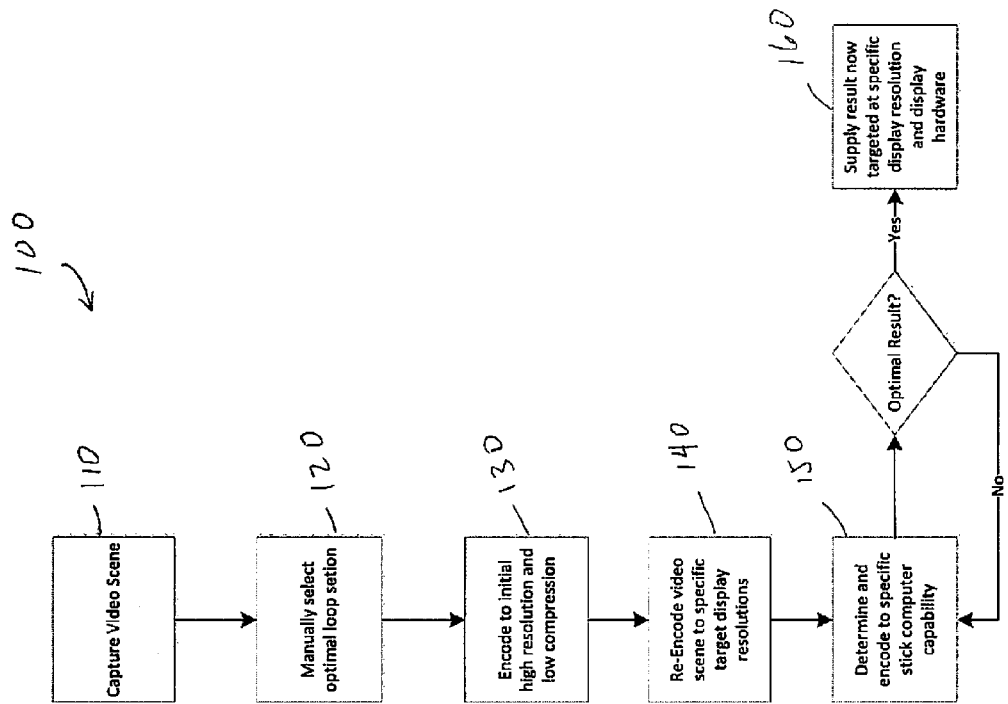

CONTINUOUS LOOP AUDIO-VISUAL DISPLAY AND METHODS

CROSS-REFERENCE TO RELATED APPLICATIONS

This application claims the benefit and priority of Provisional Patent Application Ser. No. 62/001,831 filed May 22, 2014, for CONTINUOUS LOOP AUDIO-VISUAL DISPLAY AND METHODS under 35 U.S.C. §119(e), incorporated herein by reference in its entirety for continuity of disclosure.

DESCRIPTION

Background of the Invention

1. Field of the Invention

The present invention relates to visual displays having optional audio components where the display is presented as a continuous loop, and more particularly relating to displays for viewing on a monitor or screen or the like.

2. Background Information

There are many types of displays. In one version a high quality photograph of a nature scene, such as a rising or setting sun, is displayed in a viewing room. The scene may be of any object of nature and displayed in a manner to make the viewer feel as if he or she was present within or a part of the scene. Some quality displays may also be made in or as a movie theater where sound and motion are included. In such cases the video is of a segment of time where the scene or image is displayed as having a beginning and an end. Displays may also be broadcast over a television or as part of a video recording to be viewed over and over again, whether as a movie or video segment. The content shown in the displays may be of limitless variety. In these cases the viewer is generally conscious of the passage of time where the display has a beginning and an end and/or the viewer is aware that the display or video may be repeated; or in the case of a still image, the display is frozen in time yet lacks a full feature of visual motion or audio presentation.

Some examples of displays include television user interfaces. In one example incorporated into a user interface is a continuous loop of video configured to be displayed with the end and the beginning of a video clip seamlessly merged. Examples of displays that include video loops or the processing of video sequences include those found in patents such as U.S. Pat. No. 8,220,021, U.S. Pat. No. 2011/0235998, U.S. Pat. No. 4,979,050, U.S. Pat. No. 5,513,306 and U.S. Pat. No. 5,519,828. While displays of numerous varieties have existed for years, and while these patented items and other systems may have useful features, there is room for improvement.

SUMMARY OF THE INVENTION

The present display is configured to provide a smooth and natural environment without perceptively repeating elements. For instance, in one aspect an audio visual display is presented in a viewing room (such as displayed on a screen or computer or television monitor). While a video clip may repeat as a loop, the display is configured such that a person is unable to perceive the repetition or splice of the looped segment. The video image is also configured so as to minimize or be devoid of outlier elements that may lead a viewer to perceive repetition. The present display allows for a unique sensation where the viewer is locked in time (such as when viewing a still image) yet experiences video motion and audio variety without the sense of being caught in a continuous loop. The sensation is for the viewer to feel an unending natural environment which is in continuous motion yet which is created through a continuous loop. An audio component may be included with the video loop. The audio component may also be a looped segment where the splice between end and beginning is imperceptible to a person without aids. The audio may be captured in real-time along with the video component, or may be superimposed onto or with the video.

In one aspect the audiovisual work may be displayed in high definition on a computer or television monitor or screen. The work may include a scene from a beach with the waves naturally moving to and from the sea, with the sun raising or setting, together with the captured audio component of the wave motion and background sounds of wind or wildlife. In other varieties, for instance, the scene may be of a stream or flowing brook where the water is visibly flowing (or rushing) while the sounds of the flowing water are also presented. It may be appreciated the many different varieties of scenes may be used for the content of the audio visual work. In one aspect the length of the clip will run 30 seconds, for instance, which applicant has found to be a span of time that is sufficient in some cases to mask any repeated visual splice of the video (i.e., the attention span of a person is typically diminished after such period of time such that the person is not conscious of the repeated segment). Other lengths of clip segments (whether longer or shorter) may be used with similar result. The clip segment is also configured to be devoid of outlier elements, or configured such that outlier elements are imperceptible to a viewer or listener of the audiovisual work. For instance, in the case of a scene of the beach, the clip segment would be devoid of a bird flying through the scene, otherwise the same flying bird would be perceived again when the segment is looped or repeated. In some instances, where the length of the segment is very long, the same flying bird might not be perceived, or might not be perceived as an outlier. In other aspects, the wildlife will operate as "white noise" such that the occurrence is so prevalent that the wildlife, for instance, does not appear as a perceptible outlier. The "white noise" might also comprise leaves blowing or other random objects in motion. In another instance, a single drop or stream of water may operate as an outlier, yet with an adjusted length of the video segment such outlier may not be perceptible to a person, or at least not readily perceptible to an ordinary person viewing the work.

In a further aspect the time loop may be an extended time loop (such as video taken over a 24 hour segment) to coincide with the time of day of the replay for the viewer. For instance, the video may be of an early morning sunrise at a beach that is displayed in the waiting room of an office or lobby at an early part of a workday (which may or may not coincide with the corresponding time of day of the video recording; or may be time-shifted to allow a more generalized early beach experience (i.e., 6 am) to be played during an "early" office opening (i.e., 9 am)). The time segment may proceed at real time or at a greater (or less) than real time so that an ending time phase at the beach (such as 9 pm) may be displayed at an ending time at the office (such as at 5 or 6 pm). Alternatively, the long-play time segment may repeat (i.e., every 24 hours) so that the time of day of the captured image corresponds to the time of day of the displayed image. In this manner, the scene of a beach may be displayed continuously throughout the day to coincide with the time of day at the office or viewing setting. Various time shifting or delays may be used as desired. In one aspect the work is devoid of outliers or of visually perceptible outliers. A variety of types of scenes may be displayed. The works may be stored at the television or other device, or broadcast or downloaded to the display device as desired or retrieved from the "cloud" or via internet access. A subscription service may be available for users to select between a variety of types of scenes to be displayed.

In a further aspect, the invention includes a method of displaying an audio-visual image which includes displaying on a screen a continuous loop video clip such that a start and an end of the clip is imperceptible or substantially imperceptible to a person, and presenting an audio component with the video clip. The method includes displaying the clip in such a manner that a person is unable to ascertain a repeated segment of the clip. A normally perceptive person is unable to ascertain whether the segment is a repeating segment. In some cases a normal or reasonably perceptive person might be able to ascertain a repeating segment if using special equipment (i.e., equipment other than corrective lenses), but without special assistance the normal or reasonably perceptive person would not be able to perceive that the segment was repeating or able to ascertain a splice in the looped segment.

In a further aspect the invention includes a method of creating an audio-visual work comprising the step of capturing a visual data segment that is devoid of perceptible outlier objects and configuring the visual data segment to display as a continuous loop. In a further aspect the segment may include outlier objects, yet such objects are of the type not perceptible to a reasonably perceptive person or the image can be manipulated to lessen the perceptibility that the segment is a looping segment.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 3 is a front view of one representation of a video segment feature in accordance with an aspect of the present invention.

FIG. 4 is a partial magnified view of the aspect shown in FIG. 3.

FIG. 5 is partial representation of a video segment feature in accordance with an aspect of the present invention.

FIG. 8 is a flow diagram representing further features in accordance with a further aspect of the present invention.

Figure 1:
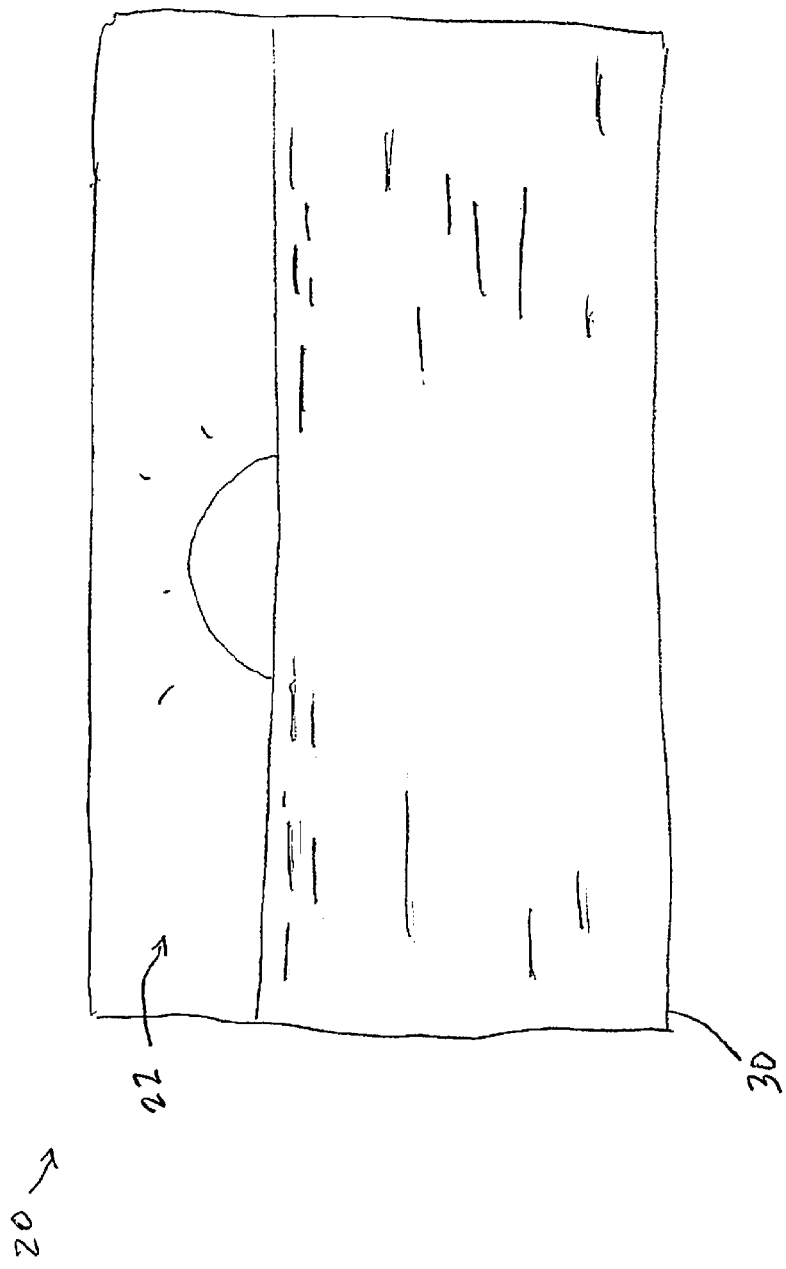
FIG. 1 is a representative view of a display in accordance with one aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-8, aspects of the display, method of displaying, and method of creating a display or audiovisual work are shown. In one aspect, display 20 includes an image of a scene displayed on a screen 30 as generally shown in FIG. 1. Screen 30 may include a television screen or computer monitor, electronic display device such as a phone or tablet or other personal device. Screen 30 may include any of a number of varieties of monitors or HDTV, 4k Ultra HD Plasma or LED monitor, Ipad, Glass, VR goggles, projector or projection screen, movie theater screen, or other display. On the screen 30 is shown a scene 22. In one instance scene 22 is of a beach setting showing a sunrise/sunset with the waves of water flowing toward and away from the beach or land. It may be appreciated that scene 22 may include numerous different varieties of subject matter. A speaker or sound system may also be used in conjunction with display 20 to project an audio aspect.

Figure 2:
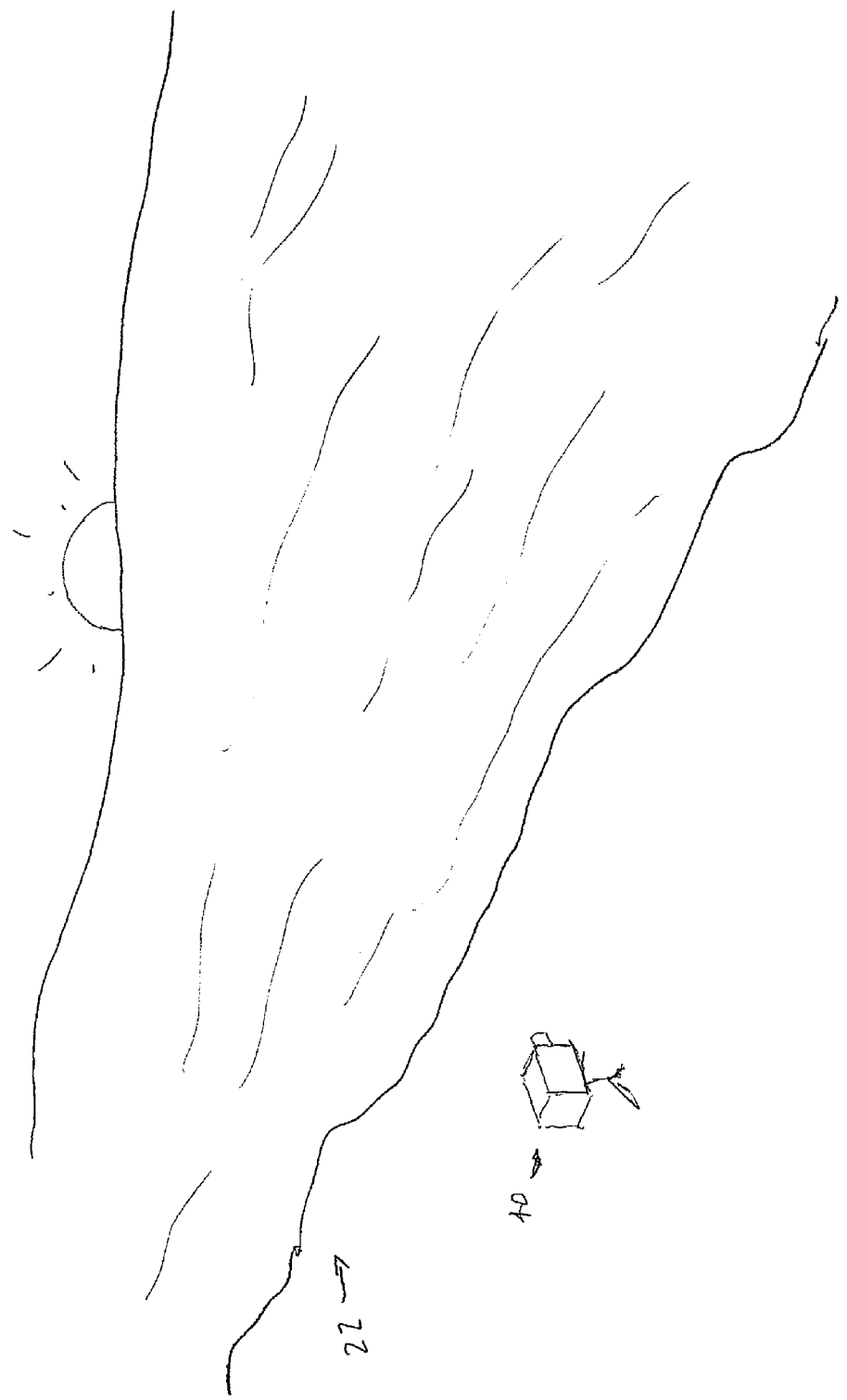
FIG. 2 is a perspective view of a physical scene where an image is captured in accordance with a further aspect of the invention.

FIG. 2 shows a camera 40 positioned at scene 22 and configured to capture the view of scene 22. In FIG. 2 the scene happens to be that of a setting/rising sun as generally shown in FIG. 1. Different settings and scenes may be used or captured. Camera 40 may be any variety of camera configured to capture a scene. Camera 40 is a video camera or includes video capture abilities. Camera 40 may be a professional grade camera or other varieties, including a personal camera or telephone equipped with video capture functions. In one aspect camera 40 may be configured to be stationary while in other aspects camera 40 may move or be mobile or otherwise capture image while camera 40 is in motion. In some applications camera 40 may be a special camera configured to capture or produce high quality video and audio recordings.

FIG. 3 is a representation of a video log row 50 containing key frames 52 and key frame markers 54. It may be appreciated that the video that is captured by camera 40 may be represented in different ways. In one aspect, row 50 is an organized overview of the contents of a database or other storage device where the captured video information of scene 22 is contained. The image data captured by camera 40 may be loaded into a computer or video editor to be analyzed and configured for use in the display 20 and methods of the present invention. The captured image data may be displayed on an editor in different format. FIG. 4 is a close-up partial view of a representative video log 50 showing key frame 52 and markers 54. It may be appreciated that different display formats may be used without departing from the invention. A video end 56 of video log 50 is shown with a multiple vertical line display. A video beginning 58 is shown with a double-line representation.

FIG. 5 shows video log 50 together with a copy of video log 50'. Video log 50' is identical to video log 50, and is presented for illustrative purposes of showing one aspect of providing a video loop configured so that the ending and beginning seamlessly merge together. Merging the ending and beginning aspects are done to give the effect of a continuous video stream as the display presents the scene from beginning to end, looping back to the beginning of the segment each time the end is reached. When a video loop is created, the playback may start anywhere along the loop, not necessarily at the video "beginning" 58 or the video "end" 56.

In one aspect, a particular key frame 52 positioned at or toward the end 56 of the video log 50 will be compared to other key frame 52 elements of the video log 50. There is no requirement of using a key frame 52 located toward the end 56 (or beginning), and it may be appreciated that the key frame 52 may be selected from different portions or areas of the video log 50. In one instant, and for ease of display, the comparison of the frame 52 may be made to the copy 50' of video log 50. A user may ascertain which key frame 52 or key frames 52 of log 50' most closely match a particular key frame 52 of log 50. A user or editor may do this by side-by-side (or top-to-bottom, or other orientation) comparison. For instance, a key frame 52a (and or sequence such as key frames 52a and 52b) may be a close match to key frame 52a' (and/or sequence such as key frames 52a' and 52b')(or a close match to a longer sequence of frames or captured data). A user may compare the respective frames or other components of the video in order to designate a location of the captured video log (or video) in order to configure a splice or location of the video where a smooth or relatively smooth or seamless transition takes place. A user may compare respective frames to obtain a best fit for making a seamless or near seamless fit.

In one aspect the splice (or seam 60) may be configured in such a way such that the scene 22 is presented with an imperceptible transition from the video end to the video beginning. A user may display the rows 50, 50' in various configurations or orientations to assist in determining a close fit. Segments of the rows 50, 50' may be "run" (i.e., a comparison of in-motion segments) so the user or editor may appreciate the flow of video segments over time. Reviewing the motion segments allows the user or editor to better ascertain whether a match or close match is likely. The motion segments may be often repeated and compared as desired. If the captured scene is of a rushing stream of water, a user will attempt to identify frames 52 at the end of the row 50 which closely match frames 52 at the beginning of the row 50/50' (or even at other locations throughout the video). When capturing video of a real-world scene, it is sometimes or often difficult to capture or identify a frame 52 at an end area of the row 50 that is identical or nearly identical to a frame 52 at the beginning area of the row 50/50'. In some cases, the length of time (or amount of frames 52) separating the beginning area of a row 50 from the ending area of the row 50 is relatively long (i.e., several minutes and/or several frames) while in other cases a short clip or row 50 is captured. The longer the video clip, the more frames 52 there are to choose from, yet the more likely it may be that the scene is changing since it is of a real-world environment (with unpredictable natural or nature elements).

Applicant appreciates that capture of a video segment of approximately 30 seconds (in the case of a rushing stream of water, for instance) is likely to produce a video row 50 having a sufficient amount of similar ending/beginning frames 52 to find a possible match or seam location 60 while including a sufficient length to the video. In one aspect, the 30 second video avoids troubles with longer videos while providing sufficient content and length to provide a quality loop. It may be appreciated that in general, the longer the video, the less likely it is for the presence of identifiable outliers when played as a loop. For instance, if there are a few minor outliers (such as a single small droplet springing from the natural flow of water), it would be impossible or nearly impossible for an unaided person (i.e., without the use of special equipment) to determine or appreciate the existence of the errant droplet if repeated once on a video segment lasting an hour. Yet an hour-long video may also be more likely to result in the capture of several outliers. Even so, spread over such a long period of time, it is unlikely a pattern will be detected in a loop spanning an hour. Of course, an hour-long segment would present its own problems due to the changing environment over such a long period of time. For instance, the shadow and light intensity of the natural scene would change (sometimes dramatically) such that it could be difficult or unworkable to identify a frame 52 at the ending area of the hour-long segment 50 which could be sufficiently similar to a beginning area of the same segment. The similarity of respective frames is important in order to provide a realistic flow at the seam 60. Further, if a relatively long row 50 is used for the loop, greater resources may be required for loading and/or rendering and/or displaying the loop. Longer length video often requires a larger file size. File compression may assist in providing the longer loop. Yet compression may reduce the quality of the video. If high quality video is used, generally small glitches, pauses or aberrations are noticeable to a viewer. Thus, assuring a seamless seam 60 is emphasized. In the example of a 30 second loop (about 30 seconds) of a running brook or stream, Applicant appreciates the 30 second duration is sufficiently long for an ordinary viewer to avoid perception of a loop or seam 60 and sufficiently long to provide variety in the natural scene display to appear realistic, while short enough in duration to avoid shadow or other outlier effects and also short enough to provide a small file size that loads quickly and repeats without glitches or other problems. The file is formatted to run on common display devices, and may be delivered wirelessly as desired.

It may be appreciated that a seam 60 may be established where a particular frame (frame 52a for instance; or multiple frames) is designated as the beginning or end frame for the looped video segment. For instance, video log 50 may be truncated at seam 60 so that the video begins an apparent seamless transition at frame 52a (which corresponds to a frame 52a' of video log) which appears relatively close to a video beginning 58. In this manner the video segment may be displayed from beginning to end to beginning to end in a continuous loop with apparent seamless transition. Such smooth transition is imperceptible or substantially imperceptible to a reasonably perceptible person.

It may be appreciated that a variety of digital manipulation methods may be used to create the seamless or substantially imperceptible seamless transition, including but not limited to digital manipulation of the particular frames. It may also be appreciated that different visual markers or data elements may be identified within the video data which may also be used to find a best or closest fit for splicing a video ending to a video beginning for the looped segment. Computer techniques and algorithms may be used to find the best or optimal segments of video data for creating the seamless or substantially imperceptible seamless transition for the looped video segment. Video recognition and comparison techniques and algorithms may be used to more efficiently test likely seam 60 candidates.

Key frame markers 54 may being used, for instance, to track the various frames 52 and may include additional marking or tracking data, including timing data. Other frame markers or tracking and timing mechanism may also be used.

In one aspect the key frame 52 is a sampling of the captured video. A "frame" may mean a unique portion of information from a database of the stored video or of the raw video data footage. While this particular term "frame" is appropriate for describing video frames, it is not intended to be limited to that definition alone and can be used to describe any discernible portion of information from a wide range of different types of databases or electronic stored data.

It may be appreciated that in a given scene 22 the various physical properties may be analyzed and marked so that a seamless transition may be created from an end of the video to a beginning of the video to create a segment that may be looped with a seamless splice or imperceptible or substantially imperceptible splice. Digital manipulation may be used to insert soft or fuzzy or blurred image segments to ease the transition to make the change from beginning to end a more natural (or less noticeable) transition. Digital manipulation may also be used to edit features shown in the scene to more easily blend such features from frame-to-frame. In one aspect, for instance, the positioning or size of a water droplet or shadow or other features shown in a frame may be modified to match or more closely match the same features shown in an adjacent frame or frames. In this way an editor may modify images in a series of adjacent frames in order to make a smooth visual transition at seam 60 (or via several frames at or adjacent seam 60). Digital manipulation may also be used to remove or edit outliers from the video data.

In one example, a video segment 50 is captured of a scene 22. Segment 50 may be captured over a particular interval, such as one minute. Thereafter the segment is analyzed and manipulated (via truncation and splicing, for instance) to create a video loop segment. The loop segment is then displayed at display 20. An audio segment may also be included. In one aspect the audio segment corresponds to the video, i.e., as the rushing waves ebb and flow, as does the corresponding audio of ebbing and flowing waves in proportion to the video display. Another example is to capture the audio of a running brook or stream of water. The audio may be captured simultaneously with the video as is common. The audio segment may also be manipulated and spliced so as to be seamless or substantially perceptibly seamless. Different audio may be used in conjunction with the video segment as desired. In some instances an audio segment or even an audio loop may be used in addition to the natural audio captured from the scene. A music component may be added as desired. In one example the audio segment naturally corresponding to simultaneously captured video segment may be looped simultaneously with the video or may be looped at a different phase, i.e., the audio timing may slightly trail the video timing or vice versa to better create a seam 60 (i.e., if both the video and audio of a constantly flowing brook or stream of water are spliced at the same seam 60, there may be more opportunity of perception of the splice, whereas phase shifting the audio may lessen the perceived seam 60 because the audio splice would occur at a different time/location).

Different segment durations may be used as desired or as needed to achieve a seamless or substantially perceptibly seamless loop segment. In the case of capturing video of a sunrise/sunset, the length of the loop segment may be relatively short in order to display a segment that avoids perceptible looping due to the relatively fast motion of the sun along the horizon, for instance. A loop segment interval of about two minutes, for instance, may be too long of an interval to use for a loop segment given the relatively fast rising or dropping of the sun along the horizon (i.e., it may be too difficult to splice a loop segment where the sun does not jump or drop at the splice of the loop). Accordingly, and depending on the content of the scene, a variety of loop segments having a variety of durations may be analyzed and manipulated to provide a desired display 20. In other aspects a long loop segment may be desired, such as capturing the full day range of a sun. While the movement of the sun is perceptible in the display over an extended period of time, the movement is substantially imperceptible over a short time interval (such as a few minutes or even seconds).

In one aspect the data segment, which segment comprises a portion of the captured video containing an outlier, is configured such that the outlier becomes imperceptible when the segment has a run-time spanning beyond a cognitive recall duration of a viewer. For instance, a normal viewer, without the use of visual aid other than normal corrective eyewear, will have a generally defined cognitive recall ability where the viewer is able to discern repeat patterns. If the duration of the repeated segment is sufficiently long, however, it becomes increasingly difficult for a person of normal cognitive and visual ability to recognize or appreciate a repeat of images. While the cognitive recall abilities may vary among the population, in general there are threshold levels at which most or the great majority of viewers are unable to ascertain the repetition, or to do so without intense focus or efforts. In one aspect the repeating segment is configured to have a duration sufficiently beyond an applicable threshold of cognition. The segment duration may vary depending on many factors. Where outliers may be present, the duration will likely be increased so as to lessen the likelihood of detection. Where few or no outliers are present in a video segment, a relatively short segment may be sufficient to avoid detection of the loop. Applicant has found in one instance a video clip of about 30 seconds (such as a video of a moving stream) provides a decent duration to minimize the impact of outliers such that a loop of the segment becomes undetectable or substantially undetectable to a person having normal visual and cognitive ability.

In one aspect the video content may be downloaded from the cloud or via the internet. Users subscribe to a service that delivers a desired audiovisual work. The content may be delivered to any desired screen. A variety of works may be indexed for multiple subscribers to enjoy. A variety of works may be created to present a library of options for viewing, and play lists and groups may be created, together with rating systems and preferences and a social media aspect.

It may be appreciated in alternative aspects that a portion of the looped segment may nonetheless include perceptible looping or outliers. In some instances an acceptable amount of outliers may be included depending on the nature of the display. In a case where the duration of the display is for a significant period of time, such as a one hour loop, the use of some outliers in the loop become less perceptible or even substantially imperceptible. For example, in a scene where an occasional leaf or other outlier passes in view at a point during an hour long segment, the same repeating leaf will not be visible for another hour (or other loop segment duration). In such case the outlier leaf is also substantially imperceptible in the context of the entirety of the display 20. The imperceptibility of an outlier object depends in part on the duration of the audiovisual work, among other viewing factors. Other factors include the type of visual work, amount of background noise or overall motion in the viewing space, camera angle, light intensity, time of day or year, size of screen, speed of replay, among other factors.

While the captured image is of a real world object, setting or scene, it may be appreciated that with advancement in computer graphics the "captured" image may also be a computer generated image made to look like or resemble the real world. The computer graphic image in a video segment may be configured such that looping the segment produces no visually perceptible splice or outliers or the looping of the segment is otherwise imperceptible.

In some aspects an audiovisual work may also include graphic displays or messages presented in conjunction with the moving image. While such messages may present an outlier aspect, in some instances the work may be configured such that a user may opt to include the same, at least when starting or ending a viewing session. Messages or instructions or other elements may be included in the screen display if desired.

In a further example, a video segment 50 is captured of a scene 22. Segment 50 may be captured over a particular time interval. A portion 70 (see FIG. 6 and FIG. 7) of the segment 50 may be selected for analysis, such as a portion 70 comprising several key frames 52 (such as a series of key frames 52*d*, 52*e*, 52*f*, 52*g*, 52*h* . . . 52*n*. Portion 70 may comprise a different set of key frames 52. In one aspect a portion 70 will be analyzed with respect to a different portion 70' which is a portion of segment taken from a different time or section of video log row 50. Attempts will be made to select a portion 70 which matches or closely matches the graphical properties of portion 70'. It may be appreciated that portion 70 and portion 70' may be sampled or selected from the entirety of video log row 50. It may be appreciated in one aspect that portion 70 and portion 70' may be separated in time by several seconds, minutes, hours, days, etc. In one aspect, portion 70 and portion 70' will be separated by approximately 30 seconds.

Figure 7:
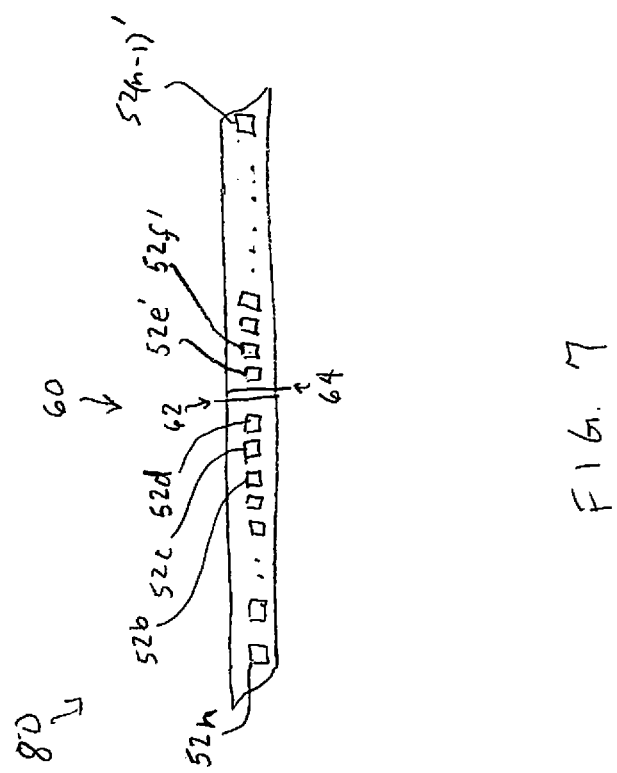
FIG. 7 is a partial representation of a video segment feature in accordance with an aspect of the present invention.
Figure 6:
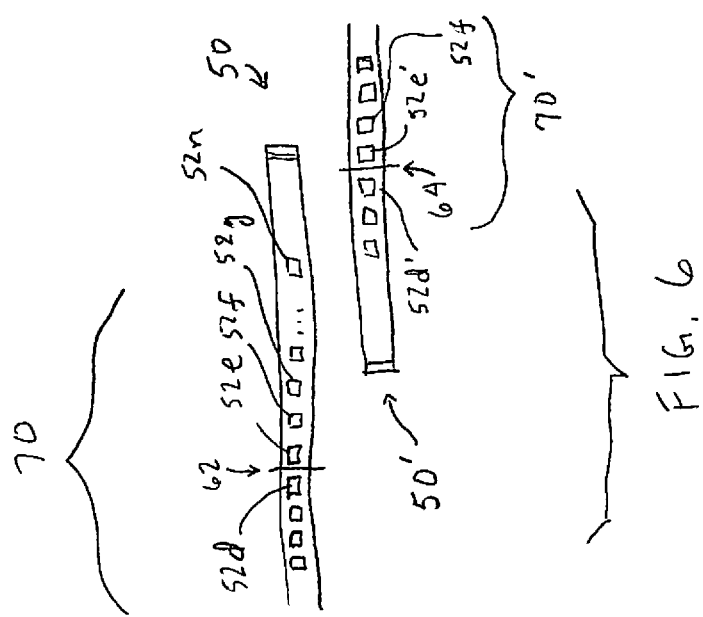
FIG. 6 is a partial representation of a video segment feature in accordance with an aspect of the present invention.

A splice or seam 60 is created by joining a cut 62 at one portion 70 with a cut 64 at another portion 70'. As shown in FIG. 6 and FIG. 7, joining cut 62 with cut 64 provides a looped row 80 which comprises part of row 50 and part of row 50/50'. It may be appreciated in one aspect that looped row 80 will present a seamless graphical display along the loop 80. For instance, the key frames 52 leading up to seam 60 will appear (or display graphics or a scene) to naturally continue via key frames 52 which trail seam 60. The displayed image naturally flows despite the seam 60.

It may be appreciated that individual key frames 52 may be manipulated, such as by changing the pixels or digital representation of the field or image of the graphic represented by a key frame. In one aspect, the data representing an image which is displayed on a key frame 52 is altered so that the data more closely (or identically) represents the data or image associated with another key frame. For instance, key frame 52*e*' may be altered to look like or identical to key frame 52*d* (or an additional key frame may be created which is a close approximation of a key frame 52 which would be positioned between key frame 52*e*' and key frame 52 (See FIG. 7). It may also be appreciated that a series of key frames 52 may be manipulated so as to provide a smooth transition at or about a seam 60. For instance, several key frames 52 which appear before seam 60 may be manipulated for a smooth transition leading to the key frames 52' which appear after seam 60 (or vice versa; or both sides of the seam 60 may be manipulated to achieve a smooth transition).

In one aspect an editor may be used to compare individual key frames 52 (or groups of key frames). In the case where a person is making edits, the person may view the various frames 52 and make a determination of appropriate frames in order to ascertain a best or smooth transition at seam 60.

A user may go through several trial and error attempts to create a successful smooth transition. The effort may be accomplished quickly or may take extended time or might be unacceptable even after hours of editing. Shortened clips or segments of video at the seam 60 location may be compared to view the video in run-time so the user may make a better informed decision as to the quality of the match. In other aspects, a software program with graphics and pattern recognition attributes may be used to select an optimal transition frame or group or set of frames. In further aspects, the software program is configured to manipulate individual frames or groups of frames to achieve a desired transition frame 52 graphic or set of frame 52 graphics. A software editing program may also be configured to present various graphic options to a person to consider. A person may use the editing program as a tool in conjunction with visual observation to achieve a desired seam 60 and frame 52 combination (using natural and/or edited frames 52). In one aspect, an editor (person or software program or algorithm) will select the most optimal frame 52 segments or portions 70. If needed, the frame portions 70 may be edited digitally to more closely approximate the starting or ending components of looped row positioned before and/or after seam 60.

In one aspect, a computer and video editing software or program are used to select and/or create an appropriately looped row 80. For instance, the software editing program is configured to analyze the individual frames 52 of a row 50 or of a portion 70. The editing program compares frames 52 with other frames of the row 50 and ascertains a frame 52 or series of frames 52 which approximate the images shown on frames 52 located at a different portion along row 50. The editing program may be configured to automatically cut and splice or otherwise create a looped row 80 based on the comparison. The program creates a short video clip of or at a region of seam 60 (or a candidate seam region). The editing program may be configured to display the selected frames or candidate seam region so a person may view the selection. The editing program may also display or run a shortened clip of the splice or the several frames before and after the seam 60. In this way the person may view the edited looped row 80 in real-time to ascertain whether the selection is appropriate. The editing program may also be configured to return a selection of one or more sampled looped rows 80. For instance, the comparison process may result in two or three (or more) different combinations of possible matches that could be viable candidates for use as a looped row 80. The candidates may all be displayed so a user can make a side-by-side comparison (or individual comparisons) as desired. The candidates may be displayed and run in real-time so that a user may view and select what they believe to be the best or most appropriate looped row 80. The multiple shortened clips may run side-by-side (or other orientation) in real time. It may be that the selected looped row 80 is ready for use as or in a file to be commercially distributed. In a further aspect, the selected looped row 80 may be further edited. For instance, the individual frames of looped row 80 may be manipulated by software or a person using editing software. A frame or frames of the looped row 80 may be manipulated in order to achieve a better match at seam 60 as needed or desired. Individual features on the frame can be replaced, enhanced or otherwise edited as desired. It may also be appreciated that the images on the frames or individual frames 52 may be manipulated prior to a joining of the row 50 or creating of the looped row 80.

A looped row 80 comprises a seam 60. It may be appreciated that seam 60 may not actually be visible, rather seam 60 may not be an actual seam but an identification or marker as to where the pre-seam frames 52 and post-seam frames 52' are joined. The editing software may track the location of the seam/marker and may use algorithms to vary and sample alternative seam locations. It may also be appreciated that a looped row 80 may comprise more than one seam 60. Multiple segments of a row 50/50' may be spliced or joined together as a single looped row 80. The techniques used to create a single seam 60 may be used to create two or more seams 60 positioned at various locations along looped row 80.

It may be appreciated that the rendering of digital graphics for use in a digital video display requires computer processing and rendering of the data so that appropriate motion may be displayed. The effectiveness, time and quality of the digital processing or rendering depends in part on the computer equipment used for such purposes. It may be appreciated that large amounts of data (especially data representing dramatic changes in terms of light, focus, motion and scene content, etc.) typically require greater processing resources as compared to graphics with minimal variation from frame-to-frame over time. For lengthy video log rows 50, such as those spanning several minutes or hours, the amount of processing resources may be extreme compared to the processing resources required for shorter length video segments. Such long processing times are also difficult to work with when a video file is to be run or displayed at a display device. The display device may not be equipped with sufficient resources to display the video file appropriately (i.e., to assure a lack of stuttering or fuzziness or other troubles with use files too large for the display device to efficiently process or display). As hardware devices become more powerful, and together with use of software manipulation to achieve smaller file sizes, the nature of the video files can be adjusted for improved use.

In one non-limiting example, Applicant has achieved improved rendering results by using video segments which run approximately 30 seconds while using standard computers capable of running video editing software. The editing software allows a user to manipulate video into a desired format. Such standard computer equipment includes personal computers such as laptops or desktop computers with video editing software. The video editing software is used to select specific segments of captured raw video and to organize the selected segments into a specific looping section or various looping sections. A goal is to utilize the editing software to create an optimal seamless loop or loops. It may be appreciated that various video compression techniques and formats may be used to assist in obtaining sufficient quality of video to be edited and/or displayed on a rendering device. Use of a 30 second loop is desired in one aspect because it allows the format to be properly digitally encoded without requiring a long period of rendering time. With such a platform, applicant appreciates that attempts to "render" a file that is larger than about 30 seconds, for instance, a file that is about 60 seconds or greater (or in some instances depending on the nature of the graphics, about 45 seconds or greater) results in a more defined seam 60 which is easily ascertainable by a reasonable viewer under normal viewing conditions. The size of the captured file or loop segment is primarily dictated by the duration of the video or segment. The larger the file size, the more computing or rendering resources and time are required. Longer video loops tend to be less noticeable given the longer duration and relative minimal presence of a seam or seams in relation to the entirety of the loop. However, longer segments also provide the greatest risk on reload for looping (assuring the larger looped file runs properly, repeatedly). An editor will attempt to balance the file size, type of video and quality of video with a particular rendering device (i.e., with a display device having built-in rendering or display hardware; or equipped to receive an input feed). It may also be appreciated that not all display devices and/or rendering equipment is created equally. What may be rendered or displayed on one device may look different (and sometimes substantially different) on a different device. In one example, a video editor may identify an ideal location among the video row or clip to insert or initiate the loop such that a seam or appreciation of a loop video may be less noticeable on a particular rendering device.

A variety of video editing techniques may be used to achieve a more optimal looping video. Unlike simple video looping, editing techniques are utilized to provide an optimal loop for the specific hardware and rendering software target. Rendered video files that have low video encoding compression tend to cause longer hardware load times during each loop. This longer load time may result in the hardware/software to "blink" during looping. Such blink is unfortunate because it detracts from the realistic video impression being created. Depending on the nature of the video, a higher video compression may be utilized to reduce file size without reducing video quality. An editor may appreciate a potential tradeoff between rendering hardware/software performance and configuring the video to be displayed on the most commonly used or predicted type or types of video screens or sizes of video screens. It may be the case that the video loop is rendered and displayed and/or edited one way for a particular display purpose (or associated display equipment) and another way for a different display purpose (and different display equipment).

In one aspect the looped row 80 is created and edited to a workable or different file that may be sent to or loaded on a display device (in some instances the looped row 80 will already be in a proper file). For instance the resulting file may be played on an iPad or Android tablet or Android video stick or other tablet, video stick or other device. A video stick may include a device configured to insert into a television. The stick (such and an Android video stick) may include memory and programs and program files which are played on the television. The stick may include video looping software such that files on the stick may be displayed in a looping format at the display device. The display device may be a kiosk, television or other device. In one aspect, the file may be included on an Android stick computer or device. One example of a software looping application that runs on an Android OS is called "SureVideo". Other software brands may be used. A run-file 90 (i.e., a rendered, manipulated, formatted or derivative of looped row 80, for instance) may be loaded onto a stick for insertion into a television or similar display device. Upon insertion or activation of the stick, the looping software application and run-file 90 may be activated or loaded (and alternatively lock the screen so that the base Android OS can be protected via password).

In reference to FIG. 8, one aspect of a system or method in accordance with the invention is shown in a general diagram. A system 100 for the presentation of looped video on a display includes a step 110 to capture a video scene. Here a person captures a video scene with the highest possible video resolution. Care should be given to the amount of motion in the target scene since this will impact the looping and edit process. If there is dramatic motion in the scene it will be difficult or impossible to prepare a seamless-looking loop. It may also be appreciated that efforts can be made to avoid capture of dark scenes which are particularly problematic since they tend to cause pixilation under future compression of the data which is often used or required to render the video into a format useable on a display device (such as on a table computer or video stick-television). Understanding these attributes of video editing and processing are helpful when selecting and capturing the scene for the video. Different scenes will present different results.

The video images may be captured in many different varieties of formats. A user may be more familiar with or have a favorite base capture video format. The type of format may dictate the efforts used or needed to edit the video into a run-file 90. After the video is captured it is edited (See step 120). Edits may be made using editing software. The software may undertake automatic edits as noted above and/or manual edit and selection may occur. A variety of editing tools or software may be used. In one instant Adobe After Effects may be used. Additional or different software may be used for the edits. Also, software or a program may be used to assist in selecting or creating a desired looped row 80 as described above. The selection or creation of a looped row 80 is undertaken so that the scene is presented as a seamless-appearing loop (i.e., where there is no discernable break (or beginning/end) at the seam 60. The selection or creating of looped row 80 can be a combination of artistic skill and selection and mechanical application and use of technical tools and steps to assist in an optimal looped row 80.

After a desired looped row 80 is created at step 120, the file undergoes encoding at step 130. Encoding 130 is undertaken to manipulate the file to an initial high resolution and low compression. The primary goal for most methods of compressing video is to produce video that most closely approximates the fidelity of the original source, while simultaneously delivering the smallest file-size possible. However, there are also several other factors that can be used as a basis for comparison. The resulting file may be a large video file that is not optimal for use in desired hardware for implementing a loop (i.e., may not be appropriate for use in a media stick to run a loop on the file). If the resulting file is used in the stick compute device, for instance, a noticeable lag will or will likely be observed between each loop sequence. Further editing and file manipulation may be needed to produce a desired run-file 90. A re-encodeing step 140 may be utilized to edit the file to properly display on a target device such as a stick and television. The display device may have specific display resolutions or optimal ranges. It is best to render the file to match such resolutions. In some instances experimentation is used to provide specific scene video compression so that the least amount of pixilation is presented (this reduces file size). In some instances the compression may be addressed automatically and the user/editor may select from a variety of sample renderings. Reduction of the file size is desired to accommodate the maximum speed and rendering capability of the stick computer.

At step 150 the process includes determining and encoding the file to the capability of a specific stick computer or display device. This will assure that running the run-file 90 on a particular display device will work and that it will work with optimal seamless looping (with the highest quality and lowest working file size). The target device may include a television having 4k format (or other format such as 720 P or 1080 P or other size) and the run-file 90 may be edited for use to match such hardware specifications (together with use with the selected looping software and other hardware/ software attributes of the display device). A program such as Transcode or other program may be used to manipulate the video compression, encapsulation, and resolutions of the file. Frame rates may also be adjusted based on the specific action contained in each video file. Sampling and testing and experimentation with different encoding algorithms may be used to identify optimal visual results. Such manipulation is desired at this step because further processing of the image data is typically not available (or not possible or desirable) to occur at the display device or stick. Repeated manipulation and iterations can be implemented (even automatically by software programs) to locate an optimal result. The encoding, frame rate adjustment, video encapsulation and resolution modifications may be balanced as desired to provide a workable run-file 90. Adjustments may be made repeatedly to achieve a desired result. When the run-file 90 is complete to the satisfaction of the user/editor, it is supplied to the display device at step 160. The file may be included in a stick device or sent wirelessly or by other methods.

It may be appreciated that a run-file 90 is desired to be of small file size. In one aspect, multiple different run-files may be loaded on a video stick or device such that a user may select to display any of the looped scenes. The files may be configured such that a play of the video may begin anywhere during the loop. The high quality video having been edited to loop according to the present invention allows for use of smaller file sizes, and matching the video file with the requirements of desired display devices together with optional audio coding presents an enhanced consumer experience.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular CONTINUOUS LOOP AUDIO-VISUAL DISPLAY AND METHODS as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. An audio-visual work comprising:
   a video clip containing camera-captured video and comprising a plurality of image frames of a real world scene, object or event, a beginning portion of the video clip having a first content and an ending portion of the video clip having a second content, the beginning portion arranged to follow the ending portion in a loop configuration and with the second content being similar to the first content such that looping of the arranged clip is substantially imperceptible to an ordinary person viewing the arranged video clip during presentation on a monitor or display; and an audio component corresponding to the arranged video clip.

2. The audio-visual work of claim 1 where said video clip is configured such that an ordinary person is unable to ascertain a repeated segment of said video clip when said video clip is looped.

3. The audio-visual work of claim 1 where the arranged video clip is devoid of perceptible image outliers.

4. The audio-visual work of claim 1 where the arranged video clip includes images of random motion objects.

5. The audio-visual work of claim 1 where the audio component and the arranged video clip comprise electronic data captured simultaneously.

6. The audio-visual work of claim 5 where said electronic data is of a real world image captured by a stationary video camera.

7. The audio-visual work of claim 5 where said electronic data is captured by a camera in an outlier-free setting.

8. The audio-visual work of claim 1 where the arranged video clip includes an outlier object image having imperceptible movement to the unaided ordinary person over a short time interval and perceptible movement over a long time interval.

9. The audio-visual work of claim 1 where the arranged video clip includes video of a real world setting displayed on a screen and the audio component is configured such that a start and an end of the audio component is imperceptible to a person.

10. A method of displaying an audio-visual image comprising:

displaying a continuous loop video clip containing camera-captured video of a real world setting wherein a beginning portion of the video clip includes a first content and an ending portion of the video clip includes a second content, the beginning portion arranged to follow the ending portion in a loop configuration and with the second content being similar to the first content such that looping of the arranged video clip during playback on a monitor or display is substantially imperceptible to a reasonably perceptible person; and presenting an audio component corresponding to said video clip.

11. The method of claim 10 where said displaying is accomplished such that a person is unable to ascertain a repeated segment of the clip when the clip is repeated.

12. The method of claim 10 where the arranged video clip is devoid of human-perceptible graphical outliers.

13. The method of claim 10 where the audio component is configured such that a start and an end of the audio component is imperceptible to a person.

14. A method of creating an audio-visual work, said method comprising: editing an electronic visual data segment of a real world setting captured with a video camera to create an edited data segment where a beginning portion of the edited data segment includes a first content and is arranged to follow an ending portion of the data segment which includes a second content similar to the first content such that looping of the edited data segment during presentation on a monitor or display is substantially imperceptible to an unaided person.

15. The method of claim 14 further comprising capturing audio data and where the edited visual data segment is devoid of human perceptible outlier images when displayed over a first period of time.

16. The method of claim 14 where the edited visual data segment is looped, the looped segment having a minimum run-time length of 15 seconds.

17. The method of claim 14 where at least 50% of the content of the edited electronic visual data segment is devoid of readily perceptible outlier objects.

18. The method of claim 14 where the edited data segment is looped, the method further comprising establishing a run-time duration of the edited data segment such that an outlier object contained within the captured data segment becomes imperceptible to a reasonably perceptive person.

19. The method of claim 14 where the edited data segment is looped and configured to be displayed on a screen and includes an outlier object which is perceptible to an ordinary human in ordinary circumstances when a portion of the segment containing the outlier object is viewed over a span of time less than 15 seconds and which is imperceptible to an ordinary human in ordinary circumstances when viewed over a span of time greater than 30 seconds.

20. The method of claim 14 where the editing step comprises:

automatically comparing respective frames of the data segment via a computer program to create a candidate seam region of a looped row segment and displaying the candidate seam region on a display.

21. The method of claim 14 where the edited data segment includes outlier objects where such outlier objects are imperceptible to an ordinary unaided person, and a viewer of the edited data segment is unable to ascertain looping of the edited data segment.

22. The method of claim 14 where the edited data segment has a time duration sufficient to preclude perception, by an ordinary unaided person, of a looping of the edited data segment.

23. A video clip for presentation on a display or monitor, said video clip comprising:

a video clip including captured video of a real world image, setting or event, said video clip having a beginning portion having a first content and an ending portion having a second content, the second content being similar to the first content, said video clip configured to be shown on the display or monitor in a continuous loop, the beginning portion arranged to follow the ending portion such that an ordinary person viewing the arranged video clip on the display or monitor is unable to ascertain a repeating of the arranged video clip when the arranged video clip is looped during presentation.

24. The video clip of claim 23 where the clip includes image outliers and has a time duration such that the ordinary person is unable to ascertain the outliers upon looping of the clip.

25. The video clip of claim 24 where the clip has a time duration of at least 30 seconds.

26. The method of claim 10 where the ending portion of the video clip is positioned adjacent the beginning portion of the video clip to form a seam, the seam being substantially imperceptible during playback.

27. The method of claim 14 where the data segment includes a plurality of frames having content, the step further comprising editing content of at least one of the frames.

28. The method of claim 27 where editing content of the at least one of the frames includes digital manipulation of the at least one frame.

\* \* \* \* \*